United States Patent
Tanaka et al.

(10) Patent No.: US 8,258,241 B2
(45) Date of Patent: Sep. 4, 2012

(54) METHOD FOR PRODUCING MODIFIED CONJUGATED DIENE POLYMER, MODIFIED CONJUGATED DIENE POLYMER, AND RUBBER COMPOSITION

(75) Inventors: Ryouji Tanaka, Tokyo (JP); Takahiro Nakamura, Tokyo (JP); Takuo Sone, Tokyo (JP); Toshihiro Tadaki, Tokyo (JP)

(73) Assignee: JSR Corporation, Tokyo (JP)

( * ) Notice: Subject to any disclaimer, the term of this patent is extended or adjusted under 35 U.S.C. 154(b) by 397 days.

(21) Appl. No.: 12/521,331

(22) PCT Filed: Dec. 27, 2007

(86) PCT No.: PCT/JP2007/075200
§ 371 (c)(1),
(2), (4) Date: Jul. 17, 2009

(87) PCT Pub. No.: WO2008/084724
PCT Pub. Date: Jul. 17, 2008

(65) Prior Publication Data
US 2011/0015302 A1    Jan. 20, 2011

(30) Foreign Application Priority Data

Dec. 27, 2006  (JP) ................................ 2006-352662

(51) Int. Cl.
*C08F 136/04* (2006.01)
*C08F 4/14* (2006.01)
(52) U.S. Cl. ...................... 525/331.8; 525/105; 525/150
(58) Field of Classification Search .................. 525/342, 525/383, 374, 343, 331.9, 105, 150
See application file for complete search history.

(56) References Cited

U.S. PATENT DOCUMENTS

| | | |
|---|---|---|
| 5,260,123 A | 11/1993 | Hergenrother et al. |
| 5,552,483 A | 9/1996 | Hergenrother et al. |
| 5,932,649 A | 8/1999 | Hergenrother et al. |
| 7,202,306 B2 | 4/2007 | Tanaka et al. |
| 2003/0069365 A1 | 4/2003 | Grun et al. |
| 2005/0009979 A1* | 1/2005 | Tanaka et al. .................. 524/492 |
| 2005/0070672 A1* | 3/2005 | Ozawa et al. .............. 525/331.9 |
| 2006/0264560 A1 | 11/2006 | Tanaka et al. |
| 2007/0179267 A1 | 8/2007 | Suzuki et al. |
| 2008/0188613 A1 | 8/2008 | Tanaka et al. |

FOREIGN PATENT DOCUMENTS

| | | |
|---|---|---|
| EP | 1 449 857 A1 | 8/2004 |
| EP | 1 479 698 A1 | 11/2004 |
| JP | 5 230077 | 9/1993 |
| JP | 5 271513 | 10/1993 |
| JP | 2001 48940 | 2/2001 |
| JP | 03 046020 | 6/2003 |
| JP | 2004 525232 | 8/2004 |
| JP | 2005 8870 | 1/2005 |
| JP | 2005 36063 | 2/2005 |
| JP | 2005 82735 | 3/2005 |
| JP | 2008 1742 | 1/2008 |
| WO | WO 2006/101025 A1 | 9/2006 |
| WO | 2007 066651 | 6/2007 |

OTHER PUBLICATIONS

U.S. Appl. No. 12/531,346, filed Sep. 15, 2009, Tadaki, et al.
Office Action issued Oct. 14, 2011 in Russia Application No. 2009128670/4 (With English Translation).
U.S. Appl. No. 12/089,216, filed Apr. 4, 2008, Tanaka, et al.
U.S. Appl. No. 12/521,124, filed Jun. 25, 2009, Tanaka, et al.
U.S. Appl. No. 12/521,340, filed Jun. 26, 2009, Tanaka, et al.
Office Action issued Jan. 24, 2012 in Russian Patent Application No. 2009128670/4(039872) (with English translation).
Office Action issued May 10, 2012 in Russian Patent Application No. 2009128670/4(039872), Application Filing Date: Jul. 24, 2009 (with English translation).

* cited by examiner

*Primary Examiner* — Ling Choi
*Assistant Examiner* — Chun-Cheng Wang
(74) *Attorney, Agent, or Firm* — Oblon, Spivak, McClelland, Maier & Neustadt, L.L.P.

(57) ABSTRACT

A method for producing a modified conjugated diene polymer includes a modification step (A) that subjects a conjugated diene polymer having a cis-1,4-bond content of 98.5% or more and possessing an active end to a modification reaction to introduce an alkoxysilane compound having two or more reactive groups including an alkoxysilyl group into the active end of the conjugated diene polymer, and a condensation step (B) that subjects the residue of the alkoxysilane compound introduced into the active end to a condensation reaction in the presence of a condensation catalyst that includes at least one element among the elements of the groups 4A, 2B, 3B, 4B, and 5B in the periodic table. The method can produce a modified conjugated diene polymer that exhibits low heat build-up and excellent wear resistance.

12 Claims, No Drawings

METHOD FOR PRODUCING MODIFIED CONJUGATED DIENE POLYMER, MODIFIED CONJUGATED DIENE POLYMER, AND RUBBER COMPOSITION

This application is a 371 of PCT/JP2007/075200 filed Dec. 27, 2007.

TECHNICAL FIELD

The present invention relates to a method for producing a modified conjugated diene polymer, a modified conjugated diene polymer, a rubber composition, a tire member including the rubber composition, and a tire including the tire member. More particularly, the present invention relates to a method for producing a modified conjugated diene polymer that can produce a modified conjugated diene polymer used as a material for a vulcanized rubber that exhibits low heat build-up and excellent wear resistance, a modified conjugated diene polymer obtained by the method, a rubber composition including the modified conjugated diene polymer, a tire member including the rubber composition, and a tire including the tire member.

BACKGROUND ART

In recent years, a reduction in fuel consumption of automobiles has been increasingly desired along with a demand for energy conservation. Research and development have been conducted in order to deal with such a demand. For example, a reduction in rolling resistance has been desired for tires. The rolling resistance of tires may be reduced by various methods such as optimizing the tire structure and the tire material. In particular, a reduction in rolling resistance has been studied from the viewpoint of the tire material (i.e., a rubber composition that exhibits low heat build-up).

As a rubber composition that exhibits low heat build-up, a rubber composition that contains a modified rubber and silica or carbon black as a filler has been developed, for example. For example, a modified rubber obtained by modifying a polymerization active end of a conjugated diene polymer obtained by anionic polymerization using an organolithium compound with an alkoxysilane derivative having a functional group that interacts with a filler has been proposed.

However, most modified rubbers are obtained by modifying a polymer of which the polymer end exhibits living properties. Specifically, only a small number of modified rubbers obtained by modifying cis-1,4-polybutadiene that is particularly important as a material for a tire sidewall rubber or a tire tread rubber have been proposed. Moreover, a rubber composition that contains a modified rubber obtained by modifying cis-1,4-polybutadiene and a filler such as silica or carbon black does not exhibit a sufficient modification effect. Specifically, the heat build-up of the resulting rubber composition is not sufficiently reduced. In particular, a modified rubber used for a rubber composition containing carbon black exhibits a modification effect to only a small extent.

In order to deal with the above-mentioned problems, a method that utilizes an end-modified conjugated diene polymer obtained by reacting an active end of a conjugated diene polymer having a high cis content obtained using a rare earth catalyst with a functional group-containing alkoxysilane derivative that interacts with a filler, and a method that utilizes a modified rubber obtained by adding a condensation catalyst to the reaction system when performing alkoxysilane modification have been proposed (see Patent Documents 1 and 2).
Patent Document 1: WO 03/046020
Patent Document 2: JP-A-2005-8870

DISCLOSURE OF THE INVENTION

However, a rubber composition that exhibits sufficiently low heat build-up has not been obtained even when using a modified conjugated diene polymer produced by the method disclosed in Patent Document 1 or 2. Therefore, development of a modified conjugated diene polymer that can be used as a material for a rubber composition that exhibits low heat build-up and a method for producing the same has been desired. Moreover, there is a problem that a modified conjugated diene polymer produced by the method disclosed in Patent Document 1 or 2 exhibits low wear resistance.

The present invention was conceived in view of the above-described problems. The present invention provides a method for producing a modified conjugated diene polymer that can produce a modified conjugated diene polymer used as a material for a rubber composition that exhibits low heat build-up and excellent wear resistance while maintaining required properties for rubber compositions, a modified conjugated diene polymer obtained by the method, a rubber composition including the modified conjugated diene polymer, a tire member including the rubber composition, and a tire including the tire member.

The inventors of the present invention conducted extensive studies in order to achieve the above object. As a result, the inventors found that the above object can be achieved by producing a modified conjugated diene polymer by carrying out a modification reaction that introduces an alkoxysilane compound into an active end of a specific conjugated diene polymer, and then subjecting the alkoxysilane compound residue to a condensation reaction in the presence of a specific condensation catalyst. This finding has led to the completion of the present invention.

Specifically, the present invention provides a method for producing a modified conjugated diene polymer, a modified conjugated diene polymer obtained by the method, a rubber composition including the modified conjugated diene polymer, a tire member including the rubber composition, and a tire including the tire member defined below.

[1] A method for producing a modified conjugated diene polymer comprising a modification step (A) that subjects a conjugated diene polymer having a cis-1,4-bond content of 98.5% or more and possessing an active end to a modification reaction to introduce an alkoxysilane compound having two or more reactive groups including an alkoxysilyl group into the active end of the conjugated diene polymer, and a condensation step (B) that subjects the residue of the alkoxysilane compound introduced into the active end to a condensation reaction in the presence of a condensation catalyst that includes at least one element among the elements of the groups 4A, 2B, 3B, 4B, and 5B in the periodic table.

[2] The method for producing a modified conjugated diene polymer according to [1], wherein the conjugated diene polymer has been polymerized in the presence of a catalyst composition that includes a mixture of components (a) to (c) as the main component, the component (a) being a lanthanoid-containing compound that contains at least one lanthanoid element or a reaction product obtained by reacting the lanthanoid-containing compound with a Lewis base, the component (b) being at least one compound selected from an aluminoxane and an organoaluminum compound shown by the general formula (1): $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms that is the same as or differs from $R^1$ and $R^2$), and the component (c) being an iodine-containing compound that contains at least one iodine atom in the molecular structure.

[3] The method for producing a modified conjugated diene polymer according to [1] or [2], wherein the conjugated diene polymer has a ratio (Mw/Mn) of the weight average molecular weight (Mw) to the number average molecular weight (Mn) determined by gel permeation chromatography of 3.5 or less.

[4] The method for producing a modified conjugated diene polymer according to any one of [1] to [3], wherein the conjugated diene polymer has a 1,2-vinyl bond content of 0.5 mass % or less.

[5] The method for producing a modified conjugated diene polymer according to any one of [1] to [4], wherein the condensation catalyst includes titanium (Ti).

[6] The method for producing a modified conjugated diene polymer according to any one of [1] to [5], wherein the alkoxysilane compound includes at least one functional group selected from (f) an epoxy group, (g) an isocyanate group, (h) a carbonyl group, and (i) a cyano group.

[7] The method for producing a modified conjugated diene polymer according to any one of [1] to [6], wherein an alkoxysilane compound that includes at least one functional group selected from (j) an amino group, (k) an imino group, and (l) a mercapto group is further added.

[8] The method for producing a modified conjugated diene polymer according to any one of [1] to [7], wherein the condensation reaction in the condensation step (B) is carried out in an aqueous solution having a pH of 9 to 14 and a temperature of 85 to 180° C.

[9] The method for producing a modified conjugated diene polymer according to any one of [1] to [8], wherein the conjugated diene compound that forms the modified conjugated diene polymer is at least one conjugated diene compound selected from 1,3-butadiene, isoprene, and 2,3-dimethyl-1,3-butadiene.

[10] A modified conjugated diene polymer produced by the method for producing a modified conjugated diene polymer according to any one of [1] to [9].

[11] A rubber composition comprising the modified conjugated diene polymer according to [10] as a rubber component.

[12] The rubber composition according to [11], further comprising at least one component selected from the group consisting of carbon black and silica.

[13] The rubber composition according to [12], wherein the rubber composition contains at least one component selected from the group consisting of carbon black and silica in an amount of 20 to 120 parts by mass based on 100 parts by mass of the rubber component that contains the modified conjugated diene polymer in an amount of 20 mass % or more.

[14] The rubber composition according to any one of [11] to [13], wherein the rubber component includes 20 to 100 mass % of the modified conjugated diene polymer, and 0 to 80 mass % of at least one rubber component selected from the group consisting of a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, and a halogenated butyl rubber (provided that the modified conjugated diene polymer+the rubber component other than the modified conjugated diene polymer=100 mass %).

[15] A tire member comprising the rubber composition according to any one of [11] to [14].

[16] A tire comprising the tire member according to [15].

Since the method for producing a modified conjugated diene polymer according to the present invention includes the modification step (A) that subjects a conjugated diene polymer having a cis-1,4-bond content of 98.5% or more and possessing an active end to a modification reaction to introduce an alkoxysilane compound into the active end of the conjugated diene polymer and the condensation step (B) that subjects the residue of the alkoxysilane compound introduced into the active end to a condensation reaction in the presence of a condensation catalyst that includes at least one element among the elements of the groups 4A, 2B, 3B, 4B, and 5B in the periodic table, a modified conjugated diene polymer that can be suitably used as a material for a vulcanized rubber that exhibits low heat build-up and excellent wear resistance can be produced.

Since the modified conjugated diene polymer according to the present invention is produced by the method for producing a modified conjugated diene polymer according to the present invention, the modified conjugated diene polymer can be used as a material for a vulcanized rubber that exhibits low heat build-up and excellent wear resistance.

Since the rubber composition according to the present invention includes the modified conjugated diene polymer according to the present invention as a rubber component, the rubber composition can be used as a material for a vulcanized rubber that exhibits low heat build-up and excellent wear resistance.

Since the tire member according to the present invention includes the rubber composition according to the present invention, the tire member exhibits low heat build-up and excellent wear resistance.

Since the tire according to the present invention includes the tire member according to the present invention, the tire exhibits low heat build-up and excellent wear resistance.

BEST MODE FOR CARRYING OUT THE INVENTION

Preferred embodiments of the present invention are described below. Note that the present invention is not limited to the following embodiments. Various modifications and improvements may be made of the following embodiments without departing from the scope of the present invention based on the knowledge of a person having an ordinary skill in the art.

[1] Method for Producing Modified Conjugated Diene Polymer

A method for producing a modified conjugated diene polymer according to the present invention is described below. The method for producing a modified conjugated diene polymer according to the present invention includes a modification step (A) that subjects a conjugated diene polymer having a cis-1,4-bond content of 98.5% or more and possessing an active end to a modification reaction to introduce an alkoxysilane compound having two or more reactive groups including an alkoxysilyl group into the active end of the conjugated diene polymer, and a condensation step (B) that subjects the residue of the alkoxysilane compound introduced into the active end to a condensation reaction in the presence of a condensation catalyst that includes at least one element among the elements of the groups 4A, 2B, 3B, 4B, and 5B in the periodic table.

Specifically, a modified conjugated diene polymer that exhibits low heat build-up (i.e., ensures low fuel consumption) and excellent wear resistance can be obtained by carrying out a modification reaction that introduces the alkoxysilane compound into the active end of the conjugated diene polymer having a cis-1,4-bond content of 98.5% or more, and subjecting the residue of the alkoxysilane compound introduced into the active end to a condensation reaction in the presence of the condensation catalyst that includes at least one element among the elements of the groups 4A, 2B, 3B, 4B, and 5B in the periodic table. A rubber composition that exhibits excellent processability can be obtained by mixing the modified conjugated diene polymer obtained by the method according to the present invention with carbon black and silica. A vulcanized rubber produced by vulcanizing the rubber composition exhibits low heat build-up and excellent wear resistance.

[1-1] Modification Step (A)

The method for producing a modified conjugated diene polymer according to the present invention includes the modification step (A). In the modification step (A), the conjugated diene polymer having a cis-1,4-bond content of 98.5% or more and possessing an active end is subjected to a modification reaction to introduce the alkoxysilane compound into the active end of the conjugated diene polymer.

[1-1-1] Conjugated Diene Polymer

The conjugated diene polymer used in the method for producing a modified conjugated diene polymer according to the present invention has a cis-1,4-bond content of 98.5% or more and possesses an active end. The cis-1,4-bond content is preferably 99.0% or more, and more preferably 99.2% or more. If the cis-1,4-bond content is less than 98.5%, a vulcanized rubber produced by vulcanizing a rubber composition that includes the modified conjugated diene polymer may not exhibit low heat build-up and sufficient wear resistance. The term "cis-1,4-bond content" used herein refers to a value calculated from the signal intensity measured by NMR analysis.

As the conjugated diene polymer, a polymer having a repeating unit derived from a monomer selected from the group consisting of 1,3-butadiene, isoprene, 2,3-dimethyl-1,3-butadiene, 1,3-pentadiene, 1,3-hexadiene, and myrcene may be used, for example. It is preferable to use a polymer having a repeating unit derived from a monomer selected from the group consisting of 1,3-butadiene, isoprene, and 2,3-dimethyl-1,3-butadiene.

The conjugated diene polymer may be polymerized in the presence or absence of a solvent. The solvent (polymerization solvent) used for polymerization may be an inert organic solvent. Examples of the inert organic solvent include saturated aliphatic hydrocarbons having 1 to 4 carbon atoms such as butane, pentane, hexane, and heptane; saturated alicyclic hydrocarbons having 6 to 20 carbon atoms such as cyclopentane and cyclohexane; monoolefins such as 1-butene and 2-butene; aromatic hydrocarbons such as benzene, toluene, and xylene; and halogenated hydrocarbons such as methylene chloride, chloroform, carbon tetrachloride, trichloroethylene, perchloroethylene, 1,2-dichloroethane, chlorobenzene, bromobenzene, and chlorotoluene.

The polymerization reaction temperature when producing the conjugated diene polymer is preferably −30 to 200° C., and more preferably 0 to 150° C. The polymerization reaction may be carried out in an arbitrary manner. The polymerization reaction may be carried out using a batch-type reactor, or may be continuously carried out using a multi-stage continuous reactor or the like. When using a polymerization solvent, the monomer concentration in the solvent is preferably 5 to 50 mass %, and more preferably 7 to 35 mass %. It is preferable to prevent the polymerization system from being contaminated by an inactivating compound such as oxygen, water, or carbon dioxide from the viewpoint of producing the conjugated diene polymer and preventing inactivation of the conjugated diene polymer having an active end.

As the conjugated diene polymer used in the method for producing a modified conjugated diene polymer according to the present invention, it is preferable to use a conjugated diene polymer that has been polymerized in the presence of a catalyst composition (hereinafter may be referred to as "catalyst") that includes a mixture of the following components (a) to (c) as the main component.

(a) A lanthanoid-containing compound that contains at least one lanthanoid element or a reaction product obtained by reacting the lanthanoid-containing compound with a Lewis base (b) At least one compound selected from an aluminoxane and an organoaluminum compound shown by the general formula (1): $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms that is the same as or differs from $R^1$ and $R^2$)

(c) An iodine-containing compound that contains at least one iodine atom in the molecular structure A conjugated diene polymer having a cis-1,4-bond content of 98.5% or more can be obtained by utilizing such a catalyst. Since the polymerization reaction need not be carried out at an extremely low temperature when using such a catalyst, the operation is simplified so that industrial production is facilitated.

[1-1-1-a] Component (a)

The component (a) is a lanthanoid-containing compound that contains at least one lanthanoid element or a reaction product obtained by reacting the lanthanoid-containing compound with a Lewis base. As the lanthanoid, neodymium, praseodymium, cerium, lanthanum, gadolinium, and samarium are preferably used. Among these, neodymium is particularly preferably used in the production method according to the present invention. In the production method according to the present invention, the lanthanoid elements may be used either individually or in combination. Specific examples of the lanthanoid-containing compound include a lanthanoid carboxylate, a lanthanoid alkoxide, a lanthanoid-β-diketone complex, a lanthanoid phosphate, a lanthanoid phosphite, and the like. Among these, the lanthanoid carboxylate or the lanthanoid phosphate is preferable, with the lanthanoid carboxylate being more preferable.

Specific examples of the lanthanoid carboxylate include carboxylates shown by the general formula $(R^4—CO_2)_3M$ (wherein M represents a lanthanoid, and $R^4$ represents a hydrocarbon group having 1 to 20 carbon atoms). $R^4$ in the above general formula is preferably a saturated or unsaturated linear, branched, or cyclic alkyl group. The carboxyl group is bonded to a primary, secondary, or tertiary carbon atom. Specific examples include salts of octanoic acid, 2-ethylhexanoic acid, oleic acid, stearic acid, benzoic acid, naphthenic acid, "Versatic acid" (i.e., a carboxylic acid in which a carboxyl group is bonded to a tertiary carbon atom, manufactured by Shell Chemicals Co., Ltd.), and the like. Among these, a salt of Versatic acid, 2-ethylhexanoic acid, or naphthenic acid is preferable.

Specific examples of the lanthanoid alkoxide include alkoxides shown by the general formula $(R^5O)_3M$ (wherein M represents a lanthanoid). Specific examples of the alkoxy group represented by $R^5O$ include a 2-ethylhexylalkoxy group, an oleylalkoxy group, a stearylalkoxy group, a phenoxy group, a benzylalkoxy group, and the like. Among these, a 2-ethylhexylalkoxy group or a benzylalkoxy group is preferable.

Specific examples of the lanthanoid-β-diketone complex include an acetylacetone complex, a benzoylacetone complex, a propionitrile acetone complex, a valerylacetone complex, an ethylacetylacetone complex, and the like. Among these, an acetylacetone complex or an ethylacetylacetone complex is preferable.

Specific examples of the lanthanoid phosphate or phosphite include lanthanoid salts of bis(2-ethylhexyl)phosphate, bis(1-methylheptyl)phosphate, bis(p-nonylphenyl)phosphate, bis(polyethylene glycol-p-nonylphenyl)phosphate, (1-methylheptyl)(2-ethylhexyl)phosphate, (2-ethylhexyl)(p-nonylphenyl)phosphate, mono-2-ethylhexyl-2-ethylhexylphosphonate, mono-p-nonylphenyl-2-ethylhexylphosphonate, bis(2-ethylhexyl)phosphinate, bis(1-methylheptyl)phosphinate, bis(p-nonylphenyl)phosphinate, (1-methylheptyl)(2-ethylhexyl)phosphinate, (2-ethylhexyl)(p-nonylphenyl)phosphinate, and the like. Among these, a lanthanoid salt of bis(2-ethylhexyl)phosphate, bis(1-methylheptyl)phosphate, mono-2-ethylhexyl-2-ethylhexyl phosphonate, or bis(2-ethylhexyl) phosphinate is preferable.

Among the above-mentioned lanthanoid-containing compounds, a neodymium phosphate or a neodymium carboxylate is preferable, with a neodymium carboxylate such as a neodymium salt of Versatic acid or neodymium 2-ethylhexanoate being particularly preferable.

In order to solubilize the lanthanoid-containing compound in a solvent or stably store the lanthanoid-containing compound for a long period of time, it is also preferable to mix the lanthanoid-containing compound with a Lewis base, or use a reaction product obtained by reacting the lanthanoid-containing compound with a Lewis base. The amount of Lewis base is preferably 0 to 30 mol, and more preferably 1 to 10 mol, based on one mol of the lanthanoid. Specific examples of the Lewis base include acetylacetone, tetrahydrofuran, pyridine, N,N-dimethylformamide, thiophene, diphenyl ether, triethylamine, an organic phosphorous compound, a monohydric or dihydric alcohol, and the like. The component (a) may be used either individually or in combination.

[1-1-1-b] Component (b)

The component (b) is at least one compound selected from an aluminoxane and an organoaluminum compound shown by the general formula (1): $AlR^1R^2, R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms that is the same as or differs from $R^1$ and $R^2$).

The aluminoxane (hereinafter may be referred to as "alumoxane") is a compound having a structure shown by the following general formula (4) or (5). The aluminoxane may be an alumoxane association product disclosed in Fine Chemicals, 23 (9), 5 (1994), J. Am. Chem. Soc., 115, 4971 (1993) and J. Am. Chem. Soc., 117, 6465 (1995).

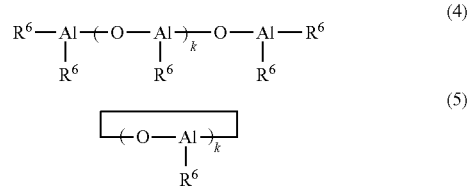

In the general formulas (4) and (5), $R^6$ represents a hydrocarbon group having 1 to 20 carbon atoms, and k represents an integer equal to or larger than 2. Specific examples of $R^6$ include a methyl group, an ethyl group, a propyl group, a butyl group, an isobutyl group, a t-butyl group, a hexyl group, an isohexyl group, an octyl group, an isooctyl group, and the like. Among these, a methyl group, an ethyl group, an isobutyl group, or a t-butyl group is preferable, with a methyl group being more preferable. In the general formulas (4) and (5), k is preferably an integer from 4 to 100.

Specific examples of the alumoxane include methylalumoxane (hereinafter may be referred to as "MAO"), ethylalumoxane, n-propylalumoxane, n-butylalumoxane, isobutylalumoxane, t-butylalumoxane, hexylalumoxane, isohexylalumoxane, and the like. Among these, MAO is preferable. The alumoxane may be produced by a known method. For example, the alumoxane may be produced by adding a trialkylaluminum or dialkylaluminum monochloride to an organic solvent (e.g., benzene, toluene, or xylene), adding water, steam, steam-containing nitrogen gas, or a salt containing crystal water (e.g., copper sulfate pentahydrate or aluminum sulfate hexadecahydrate), and reacting the mixture. The alumoxanes may be used either individually or in combination.

Specific examples of the organoaluminum compound shown by the general formula (1) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, isobutylaluminum dihydride, and the like. Among these, hydrogenated diisobutylaluminum, triethylaluminum, triisobutylaluminum, hydrogenated diethylaluminum, and the like are preferable. The organoaluminum compounds may be used either individually or in combination.

[1-1-1-c] Component (c)

The component (c) is an iodine-containing compound that contains at least one iodine atom in the molecular structure. A conjugated diene polymer having a cis-1,4-bond content of 98.5% or more can be easily obtained by utilizing the iodine-containing compound. The iodine-containing compound is not particularly limited insofar as the compound contains at least one iodine atom in the molecular structure. Examples of the iodine-containing compound include iodine, trimethylsilyl iodide, diethylaluminum iodide, methyl iodide, butyl iodide, hexyl iodide, octyl iodide, iodoform, methylene iodide, benzylidene iodide, beryllium iodide, magnesium iodide, calcium iodide, barium iodide, zinc iodide, cadmium iodide, mercury iodide, manganese iodide, rhenium iodide, copper iodide, silver iodide, gold iodide, and the like.

The above iodine-containing compound is preferably a silicon iodide compound shown by the general formula $R^7_m SiI_{4-m}$ (wherein $R^7$ represents a hydrocarbon group having 1 to 20 carbon atoms or a hydrogen atom, and m represents an integer from 0 to 3), a hydrocarbon iodide compound shown by the general formula $R^8_n I_{4-n}$ (wherein $R^8$ represents a hydrocarbon group having 1 to 20 carbon atoms, and n represents an integer from 1 to 3), or iodine. Since the silicon iodide compound, the hydrocarbon iodide compound, or iodine has excellent solubility in an organic solvent, the operation is simplified so that industrial production is facilitated.

Specific examples of the silicon iodide compound (i.e., the compound shown by the general formula (6)) include trimethylsilyl iodide, triethylsilyl iodide, dimethylsilyl diiodide, and the like. Among these, trimethylsilyl iodide is preferable. Specific examples of the hydrocarbon iodide compound (i.e., the compound shown by the general formula (7)) include methyl iodide, butyl iodide, hexyl iodide, octyl iodide, iodoform, methylene iodide, benzylidene iodide, and the like. Among these, methyl iodide, iodoform, or methylene iodide is a preferable. These iodine-containing compounds may be used either individually or in combination.

The mixing ratio of each component (components (a) to (c)) may be appropriately set. The component (a) is preferably used in an amount of 0.00001 to 1.0 mmol, and more preferably 0.0001 to 0.5 mmol, based on 100 g of the conjugated diene compound. If the amount of the component (a) is less than 0.00001 mmol, the polymerization activity may decrease. If the amount of the component (a) is more than 1.0 mmol, a deashing step may be necessary due to an increase in catalyst concentration.

When using the alumoxane as the component (b), a preferable amount of the alumoxane contained in the catalyst may be indicated by the molar ratio of the component (a) to aluminum (Al) contained in the alumoxane. Specifically, the molar ratio of the component (a) to aluminum (Al) contained in the alumoxane is preferably 1:1 to 1:500, more preferably 1:3 to 1:250, and particularly preferably 1:5 to 1:200. If the molar ratio is outside the above range, the catalytic activity may decrease, or a step of removing the catalyst residue may be necessary.

When using the organoaluminum compound as the component (b), a preferable amount of the organoaluminum compound contained in the catalyst composition may be indicated by the molar ratio of the component (a) to the organoaluminum compound. Specifically, the molar ratio of the component (a) to the organoaluminum compound is preferably 1:1 to 1:700, and more preferably 1:3 to 1:500. If the molar ratio is outside the above range, the catalytic activity may decrease, or a step of removing the catalyst residue may be necessary.

A preferable amount of the component (c) may be indicated by the molar ratio of the iodine atom contained in the component (c) to the component (a). Specifically, the molar ratio of the iodine atom to the component (a) is preferably 0:5 to 3, more preferably 1.0 to 2.5, and particularly preferably 1.2 to 1.8. If the molar ratio of the iodine atom to the component (a) is less than 0.5, the polymerization catalytic activity may decrease. If the molar ratio of the iodine atom to the component (a) is more than 3, the component (c) may act as a catalytic poison.

The catalyst preferably includes at least one compound selected from a conjugated diene compound and a non-conjugated diene compound in addition to the components (a) to (c), in an amount of 1000 mol or less, more preferably 150 to 1000 mol, and particularly preferably 3 to 300 mol based on 1 mol of the component (a). The catalytic activity is further improved by adding at least one compound selected from a conjugated diene compound and a non-conjugated diene compound which are also used as monomers for polymerization described below to the catalyst. Examples of the conjugated diene compound added to the catalyst include 1,3-butadiene, isoprene, and the like. Examples of the non-conjugated diene compound include divinylbenzene, diisopropenylbenzene, triisopropenylbenzene, 1,4-vinylhexadiene, ethylidenenorbornene, and the like.

[1-1-1-d] Preparation of Catalyst Composition

The catalyst composition used in the method for producing a conjugated diene polymer according to the invention may be prepared by reacting the components (a) to (c) dissolved in a solvent optionally together with at least one compound selected from the conjugated diene compound and the non-conjugated diene compound, for example. Each component may be added in an arbitrary order. Note that it is preferable to previously mix and react each component and age the reaction product in order to improve the polymerization activity and reduce the polymerization initiation induction period. The aging temperature is preferably 0 to 100° C., and more preferably 20 to 80° C. If the aging temperature is less than 0° C., aging may be insufficient. If the aging temperature is more than 100° C., the catalytic activity may decrease, or the molecular weight distribution may broaden. The aging time is not particularly limited. The components may be caused to come in contact in a line before adding the components to a polymerization reactor. The aging time is normally 0.5 minutes or more. The catalyst thus prepared is stable for several days.

[1-1-1-e] Properties of conjugated diene polymer

In the method for producing a modified conjugated diene polymer according to the present invention, the conjugated diene polymer preferably has a ratio (i.e., molecular weight distribution (Mw/Mn)) of the weight average molecular weight (Mw) to the number average molecular weight (Mn) determined by gel permeation chromatography of 3.5 or less, more preferably 3.0 or less, and particularly preferably 2.5 or less. If the molecular weight distribution is more than 3.5, rubber properties such as fracture properties and low heat build-up may decrease. The term "molecular weight distribution (Mw/Mn)" used herein refers to a value calculated by the ratio of the weight average molecular weight to number average molecular weight (weight average molecular weight/number average molecular weight). The weight average molecular weight of the conjugated diene polymer refers to a polystyrene-reduced weight average molecular weight determined by gel permeation chromatography (GPC). The number average molecular weight of the conjugated diene polymer refers to a polystyrene-reduced number average molecular weight determined by GPC.

The vinyl content and/or the cis-1,4 bond content of the conjugated diene polymer can be easily adjusted by controlling the polymerization temperature. The ratio Mw/Mn can be easily adjusted by controlling the molar ratio of the components (a) to (c).

The Mooney viscosity ($ML_{1+4}$ (100° C.)) of the conjugated diene polymer at 100° C. is preferably 5 to 50, and more preferably 10 to 40. If the Mooney viscosity of the conjugated diene polymer is less than 5, mechanical characteristics and wear resistance after vulcanization may deteriorate, for example. If the Mooney viscosity of the conjugated diene polymer is more than 50, the resulting modified conjugated diene polymer may exhibit inferior processability during kneading. The Mooney viscosity of the conjugated diene polymer can be easily adjusted by controlling the molar ratio of the components (a) to (c).

The 1,2-vinyl bond content of the conjugated diene polymer is preferably 0.5 mass % or less, more preferably 0.4 mass % or less, and particularly preferably 0.3 mass % or less. If the 1,2-vinyl bond content of the conjugated diene polymer is more than 0.5 mass %, rubber properties such as fracture properties may decrease. The term "1,2-vinyl bond content" used herein refers to a value calculated from the signal intensity measured by NMR analysis.

[1-1-2] Alkoxysilane Compound

The alkoxysilane compound (hereinafter may be referred to as "modifier") used in the modification step (A) has two or more reactive groups including an alkoxysilyl group. The type of reactive group other than the alkoxysilyl group is not particularly limited. For example, the reactive group other than the alkoxysilyl group is at least one functional group selected from (f) an epoxy group, (g) an isocyanate group, (h) a carbonyl group, and (i) a cyano group. Specifically, it is preferable to use an alkoxysilane compound having at least one functional group selected from (f) an epoxy group, (g) an isocyanate group, (h) a carbonyl group, and (i) a cyano group as the alkoxysilane compound used in the modification step (A). The alkoxysilane compound may be a partial condensate or a mixture of the alkoxysilane compound and a partial condensate of the alkoxysilane compound.

The term "partial condensate" used herein refers to a compound in which some of the SiOR of the alkoxysilane compound form an SiOSi bond through condensation. It is preferable that at least 10% of the polymer chain of the conjugated diene polymer used for the modification reaction exhibit living properties.

Specific examples of an alkoxysilane compound containing an epoxy group (f) (hereinafter may be referred to as "epoxy group-containing alkoxysilane compound") include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexypethyltrimethoxysilane, 2-(3,4-epoxycyclohexyl)ethyltriethoxysilane, 2-(3,4-epoxycyclohexyl)ethyl(methyl)dimethoxysilane, and the like. Among these, 3-glycidoxypropyltrimethoxysilane or 2-(3,4-epoxycyclohexypethyltrimethoxysilane is preferable.

Examples of an alkoxysilane compound containing an isocyanate group (g) (hereinafter may be referred to as "isocyanate group-containing alkoxysilane compound") include 3-isocyanatepropyltrimethoxysilane, 3-isocyanatepropyltriethoxysilane, 3-iso cyanatepropylmethyldiethoxysilane, 3-isocyanatepropyltriisopropoxysilane, and the like. Among these, 3-isocyanatepropyltrimethoxysilane is preferable.

Examples of an alkoxysilane compound containing a carbonyl group (h) (hereinafter may be referred to as "carbonyl group-containing alkoxysilane compound") include 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane, and the like. Among these, 3-methacryloyloxypropyltrimethoxysilane is preferable.

Examples of an alkoxysilane compound containing a cyano group (i) (hereinafter may be referred to as "cyano group-containing alkoxysilane compound") include 3-cyanopropyltriethoxysilane, 3-cyanopropyltrimethoxysilane, 3-cyanopropylmethyldiethoxysilane, 3-cyanopropyltriisopropoxysilane, and the like. Among these, 3-cyanopropyltrimethoxysilane is preferable.

These alkoxysilane compounds may be used either individually or in combination. A partial condensate of the above-mentioned alkoxysilane compound may also be used.

The alkoxysilane compound is preferably used for the modification reaction in an amount of 0.01 to 200 mol, and more preferably 0.1 to 150 mol, based on 1 mol of the component (a). If the amount of the alkoxysilane compound is less than 0.01 mol, the modification reaction may not sufficiently proceed so that the dispersibility of the filler may not be sufficiently improved. As a result, mechanical characteristics, wear resistance, and low heat build-up after vulcanization can not be sufficiently obtained. If the amount of the alkoxysilane compound is more than 200 mol, cost unnecessarily increases since the modification reaction is saturated. The modifier may be added by an arbitrary method. For example, the modifier may be added at one time, stepwise, or successively. However, it is preferable to add the modifier at one time.

In the production method according to the present invention, the modification reaction (A) is preferably carried out in a solution. A solution that contains unreacted monomers used for polymerization may be directly used. The modification reaction may be carried out by an arbitrary method. For example, the modification reaction may be carried out using a batch-type reactor, or may be carried out continuously using a multi-stage continuous reactor, an inline mixer, or the like. It is preferable to carry out the modification reaction after completion of the polymerization reaction, but before carrying out operations necessary for solvent removal, a water treatment, a heat treatment, polymer isolation, and the like.

The modification reaction temperature may be the same as the polymerization temperature employed when producing the conjugated diene polymer. Specifically, the modification reaction temperature is preferably 20 to 100° C. The modification reaction temperature is more preferably 40 to 90° C. If the modification reaction temperature is lower, the viscosity of the polymer may increase. If the modification reaction temperature is higher, the polymerization active end may be easily inactivated.

The modification reaction time in the modification step (A) is preferably 5 minutes to 5 hours, and more preferably 15 minutes to 1 hour. In the modification reaction of the production method according to the present invention, a conventional aging preventive or a conventional reaction terminator may optionally be added in the condensation step (B) after introducing the alkoxysilane compound residue into the active end of the polymer.

In the production method according to the present invention, it is preferable to further add a substance that is consumed by a condensation reaction with the alkoxysilane compound residue (modifier) introduced into the active end in the condensation step (B). Specifically, it is preferable to add a functional group-introducing agent. The wear resistance of the modified conjugated diene polymer can be improved by adding the functional group-introducing agent.

The functional group-introducing agent is not particularly limited insofar as the functional group-introducing agent substantially does not directly react with the active end and remains unreacted in the reaction system. For example, the functional group-introducing agent is preferably an alkoxysilane compound differing from the alkoxysilane compound used as the modifier, i.e., an alkoxysilane compound that includes at least one functional group selected from (j) an amino group, (k) an imino group, and (l) a mercapto group. The alkoxysilane compound used as the functional group-introducing agent may be a partial condensate, or a mixture of the alkoxysilane compound other than that used as the functional group-introducing agent and a partial condensate of the alkoxysilane compound.

Specific examples of the functional group-introducing agent are given below. Examples of an alkoxysilane compound containing an amino group (j) (hereinafter may be referred to as "amino group-containing alkoxysilane compound") include 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, 3-aminopropyltrimethoxysilane, 3-aminopropyltriethoxysilane, aminophenyltrimethoxysilane, aminophenyltriethoxysilane, 3-(N-methylamino)propyltrimethoxysilane, 3-(N-methylamino)propyltriethoxysilane, and the like. Among these, 3-diethylaminopropyl (triethoxy)silane, 3-dimethylaminopropyl(triethoxy)silane, or 3-aminopropyltriethoxysilane is preferable.

Examples of a preferable alkoxysilane compound containing an imino group (k) (hereinafter may be referred to as "imino group-containing alkoxysilane compound") include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, trimethoxysilyl compounds, methyldiethoxysilyl compounds, ethyldiethoxysilyl compounds, methyldimethoxysilyl compounds, and ethyldimethoxysilyl compounds corresponding to these triethoxysilyl compounds, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole, and the like. Among these, 3-(1-hexamethyleneimino)propyl(triethoxy)silane, N-(1-methylpropylidene)-3-(triethoxysilyl)-1-propanamine, N-(1,3-dimethylbutylidene)-3-(triethoxysilyl)-1-propanamine, 3-(1-hexamethyleneimino)propyl(triethoxy)silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole, or N-(3-triethoxysilylpropyl)-4,5-dihydroimidazole is more preferable.

Examples of an alkoxysilane compound containing a mercapto group (l) (hereinafter may be referred to as "mercapto group-containing alkoxysilane compound") include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, mercaptophenyltriethoxysilane, and the like. Among these, 3-mercaptopropyltriethoxysilane is preferable.

These functional group-introducing agents may be used either individually or in combination.

When using the alkoxysilane compound as the functional group-introducing agent, the alkoxysilane compound is preferably used in an amount of 0.01 to 200 mol, and more preferably 0.1 to 150 mol, based on 1 mol of the component (a). If the amount of the alkoxysilane compound is less than 0.01 mol, the condensation reaction may not sufficiently proceed so that the dispersibility of the filler may not be sufficiently improved. As a result, mechanical characteristics, wear resistance, and low heat build-up after vulcanization may deteriorate. If the amount of the alkoxysilane compound is more than 200 mol, it is uneconomical since the condensation reaction is saturated.

The functional group-introducing agent is preferably added in the condensation step (B) after introducing the alkoxysilane compound residue into the active end of the conjugated diene polymer, but before the condensation reaction starts. When the functional group-introducing agent is added after the condensation reaction has started, the functional group-introducing agent may not be homogeneously dispersed so that the catalytic performance may deteriorate. The functional group-introducing agent is preferably added when 5 minutes to 5 hours, and particularly preferably 15 minutes to 1 hour has elapsed after the modification reaction has started.

In the production method according to the present invention, when using the alkoxysilane compound containing the above-mentioned functional group as the functional group-introducing agent, the conjugated diene polymer having an active end reacts with a substantially stoichiometric amount of the modifier added to the reaction system so that the alkoxysilyl group is substantially introduced into each active end. When the functional group-introducing agent is further added, alkoxysilane compound residues are introduced in an amount larger than the equivalent of the active end of the conjugated diene polymer.

It is preferable that a condensation reaction between the alkoxysilyl groups occur between the free alkoxysilane compound and the alkoxysilyl group at the end of the conjugated diene polymer, or occur between the alkoxysilyl groups at the end of the conjugated diene polymers from the viewpoint of reaction efficiency. A reaction between the free alkoxysilane compounds is not desirable. Therefore, when adding the alkoxysilane compound as the functional group-introducing agent, it is preferable that the hydrolyzability of the alkoxysilyl group of the alkoxysilane compound be lower than that of the alkoxysilyl group introduced into the end of the conjugated diene polymer.

For example, it is preferable to use a trimethoxysilyl group-containing alkoxysilane compound having high hydrolyzability as the alkoxysilane compound reacted with the active end of the conjugated diene polymer, and use a compound having a less hydrolyzable alkoxysilyl group (e.g., triethoxysilyl group) as the new alkoxysilane compound. It is undesirable to use a triethoxysilyl group-containing alkoxysilane compound as the alkoxysilane compound reacted with the active end of the conjugated diene polymer, and use a trimethoxysilyl group-containing alkoxysilane compound as the alkoxysilane compound added as the functional group-introducing agent from the viewpoint of reaction efficiency, although such a combination is also included within the scope of the present invention.

[1-2] Condensation Step (B)

The method for producing a modified conjugated diene polymer according to the present invention includes the condensation step (B). In the condensation step (B), the residue of the alkoxysilane compound introduced into the active end is subjected to a condensation reaction in the presence of a condensation catalyst that includes at least one element among the elements of the groups 4A, 2B, 3B, 4B, and 5B in the periodic table.

The condensation catalyst is not particularly limited insofar as the condensation catalyst includes at least one element among the elements of the groups 4A, 2B, 3B, 4B, and 5B in the periodic table. It is preferable to use a condensation catalyst that includes at least one element selected from the group consisting of titanium (Ti) (3B), tin (Sn) (4B), zirconium (Zr) (4A), bismuth (Bi) (5B), and aluminum (Al) (3B).

Examples of the condensation catalyst that includes tin (Sn) include tin bis(n-octanoate), tin bis(2-ethylhexanoate), tin bis(laurate), tin bis(naphthoate), tin bis(stearate), tin bis(oleate), dibutyltin diacetate, dibutyltin di-n-octanoate, dibutyltin di-2-ethylhexanoate, dibutyltin dilaurate, dibutyltin malate, dibutyltin bis(benzylmaleate), dibutyltin bis(2-ethylhexylmaleate), di-n-octyltin diacetate, di-n-octyltin di-n-octanoate, di-n-octyltin di-2-ethyl hexanoate, di-n-octyltin dilaurate, di-n-octyltin maleate, di-n-octyltin bis(benzylmaleate), di-n-octyltin bis(2-ethylhexylmaleate), and the like.

Examples of the condensation catalyst that includes zirconium (Zr) include tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxybis(acetylacetonate), zirconium tributoxyethylacetoacetate, zirconium butoxyacetylacetonate bis(ethylacetoacetate), zirconium tetrakis(acetylacetonate), zirconium diacetylacetonate bis(ethylacetoacetate), zirconium bis(2-ethylhexanoate) oxide, zirconium bis(laurate) oxide, zirconium bis(naphthate) oxide, zirconium bis(stearate) oxide, zirconium bis(oleate) oxide, zirconium bis(linolate) oxide, zirconium tetrakis(2-ethylhexanoate), zirconium tetrakis(laurate), zirconium tetrakis(naphthate), zirconium tetrakis(stearate), zirconium tetrakis(oleate), zirconium tetrakis(linolate), and the like.

Examples of the condensation catalyst that includes bismuth (Bi) include bismuth tris(2-ethylhexanoate), bismuth tris(laurate), bismuth tris(naphthate), bismuth tris(stearate), bismuth tris(oleate), bismuth tris(linolate), and the like.

Examples of the condensation catalyst that includes aluminum (Al) include triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetonate, aluminum butoxybis(acetylacetonate), aluminum dibutoxyethyl acetoacetate, aluminum tris(acetylacetonate), aluminum tris(ethylacetoacetate), aluminum tris(2-ethylhexanoate), aluminum tris(laurate), aluminum tris(naphthate), aluminum tris(stearate), aluminum tris(oleate), aluminum tris(linolate), and the like.

Examples of the condensation catalyst that includes titanium (Ti) include tetramethoxytitanium, tetraethoxytitanium, tetra-n-propoxytitanium, tetra-i-propoxytitanium, tetra-n-butoxytitanium, a tetra-n-butoxytitanium oligomer, tetra-sec-butoxytitanium, tetra-tert-butoxytitanium, tetra(2-ethylhexyl)titanium, bis(octanediolate)bis(2-ethylhexyl)titanium, tetra(octanediolate)titanium, titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonatobis(ethylacetoacetate), titanium tributoxyacetylacetonate, titanium dibutoxybis(acetylacetonate), titanium tributoxyethylacetoacetate, titanium butoxyacetylacetonatobis(ethylacetoacetate), titanium tetrakis(acetylacetonate), titanium diacetylacetonatobis(ethylacetoacetate), titanium oxide bis(2-ethylhexanoate), titanium oxide bis(laurate), titanium oxide bis(naphthate), titanium oxide bis(stearate), titanium oxide bis(oleate), titanium oxide bis(linolate), titanium tetrakis(2-ethylhexanoate), titanium tetrakis(laurate), titanium tetrakis(naphthate), titanium tetrakis(stearate), titanium tetrakis(oleate), titanium tetrakis(linolate), and the like.

Among these, the condensation catalyst that includes titanium (Ti) is preferably used in the production method according to the present invention. It is more preferable to use an alkoxide, a carboxylate, or an acetylacetonate complex of titanium (Ti). The condensation reaction of the residue of the alkoxysilane compound used as the modifier and the residue of the alkoxysilane compound used as the functional group-introducing agent can be more effectively promoted by utilizing the condensation catalyst that includes titanium (Ti) so that a modified conjugated diene polymer that exhibits excellent processability, low-temperature properties, and wear resistance can be obtained.

The condensation catalyst is preferably used in an amount of 0.1 to 10 mol, and particularly preferably 0.5 to 5 mol, based on 1 mol of the total amount of alkoxysilyl groups present in the reaction system. If the amount of the condensation catalyst is less than 0.1 mol, the condensation reaction may not proceed sufficiently. If the amount of the condensation catalyst is more than 10 mol, the effect of the condensation catalyst is saturated (i.e., it is uneconomical).

The condensation catalyst may be added before the modification reaction. Note that it is preferable to add the condensation catalyst after the modification reaction, but before the condensation reaction starts. When the condensation catalyst is added before the modification reaction, the condensation catalyst may directly react with the active end so that the alkoxysilyl group may not be introduced into the active end. When the condensation catalyst is added after the condensation reaction has started, the condensation catalyst may not be uniformly dispersed so that the catalytic performance may deteriorate. The condensation catalyst is preferably added when 5 minutes to 5 hours, and more preferably 15 minutes to 1 hour has elapsed after the modification reaction has started.

In the production method according to the present invention, the condensation step (B) is preferably carried out in an aqueous solution. The condensation reaction temperature is preferably 85 to 180° C., more preferably 100 to 170° C., and particularly preferably 110 to 150° C. If the condensation reaction temperature is less than 85° C., the condensation reaction proceeds slowly and may not be completed. As a result, the properties of the resulting modified conjugated diene polymer may change with time so that the product quality may deteriorate. If the condensation reaction temperature exceeds 180° C., the polymer undergoes an aging reaction to exhibit poor properties.

The pH of the aqueous solution is preferably 9 to 14, and more preferably 10 to 12. The above pH range promotes the condensation reaction to improve the stability of the modified conjugated diene polymer. If the pH of the aqueous solution is less than 9, the condensation reaction proceeds slowly and may not be completed. As a result, the properties of the resulting modified conjugated diene polymer may change with time so that the product quality may deteriorate. If the pH of the aqueous solution during the condensation reaction is more than 14, a large amount of alkaline components may remain in the isolated modified conjugated diene polymer. It may be difficult to remove such a residue.

The condensation reaction time is preferably 5 minutes to 10 hours, and more preferably 15 minutes to 5 hours. If the condensation reaction time is less than 5 minutes, the condensation reaction may not be completed. If the condensation reaction time exceeds 10 hours, the condensation reaction may be saturated. The pressure inside the reaction system during the condensation reaction is preferably 0.01 to 20 MPa, and more preferably 0.05 to 10 MPa.

The condensation reaction may be carried out by an arbitrary method. The condensation reaction may be carried out using a batch-type reactor, or may be carried out continuously using a multi-stage continuous reactor or the like. The condensation reaction may be carried out while removing the solvent.

After completion of the condensation reaction, the resulting product is conventionally post-treated to obtain a modified conjugated diene polymer.

[2] Modified Conjugated Diene Polymer

A modified conjugated diene polymer according to the present invention is produced by the method for producing a modified conjugated diene polymer according to the present invention. The modified conjugated diene polymer is used as a material for a vulcanized rubber that exhibits low heat build-up and excellent wear resistance. The modified conjugated diene polymer is obtained by introducing the above-mentioned alkoxysilane compound (modifier) into the active end of the above-mentioned conjugated diene polymer, and subjecting the residue of the alkoxysilane compound introduced into the active end to undergo a condensation reaction in the presence of the above-mentioned condensation catalyst.

The Mooney viscosity ($ML_{1+4}$ (125° C.)) of the modified conjugated diene polymer according to the present invention is preferably 10 to 150, and more preferably 20 to 100. If the Mooney viscosity ($ML_{1+4}$, 125° C.) of the modified conjugated diene polymer is less than 10, rubber properties such as fracture properties may deteriorate. If the Mooney viscosity ($ML_{1+4}$, 125° C.) of the modified conjugated diene polymer is more than 150, workability may deteriorate so that it may be difficult to knead the modified conjugated diene polymer with additives.

The molecular weight distribution (Mw/Mn) of the modified conjugated diene polymer is preferably 3.5 or less, more preferably 3.0 or less, and particularly preferably 2.5 or less. If the molecular weight distribution of the modified conjugated diene polymer is more than 3.5, rubber properties such as fracture properties and low heat build-up may decrease.

The cold flow value (mg/min) of the modified conjugated diene polymer is preferably 1.0 or less, and more preferably 0.8 or less. If the cold flow value of the modified conjugated diene polymer is more than 1.0, the shape stability of the polymer during storage may deteriorate. The term "cold flow value (mg/min)" used herein refers to a value calculated by a measuring method described later.

The temporal stability of the modified conjugated diene polymer is preferably 0 to 5, and more preferably 0 to 2. If the temporal stability of the modified conjugated diene polymer is more than 5, the properties of the polymer may change during storage. The term "temporal stability" used herein refers to a value calculated by a measuring method described later.

[3] Rubber Composition

A rubber composition according to the present invention includes the above-mentioned modified conjugated diene polymer as a rubber component. The rubber composition is used as a material for a vulcanized rubber that exhibits low heat build-up and excellent wear resistance. The details of the rubber composition are described below.

[3-1] Rubber Component

The rubber composition according to the present invention includes the above-mentioned modified conjugated diene polymer as a rubber component. The content of the modified conjugated diene polymer in the rubber component is preferably 20 mass % or more, more preferably 30 mass % or more, and particularly preferably 40 mass % or more. If the content of the modified conjugated diene polymer in the rubber component is less than 20 mass %, the rubber composition may exhibit insufficient mechanical properties (tensile strength and tensile elongation), insufficient crack-growth resistance, and insufficient wear resistance.

The rubber component may include one or more types of the modified conjugated diene polymer. The rubber component may include a rubber other than the modified conjugated diene polymer. Examples of the rubber other than the modified conjugated diene polymer include a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, a halogenated butylene rubber, and the like. These rubbers may be used either individually or in combination. The rubber other than the modified conjugated diene polymer may be a rubber that is partially polyfunctionalized (e.g., a branched structure is introduced by a treatment using a modifier such as tin tetrachloride or silicon tetrachloride).

[3-2] Carbon Black and Silica

It is preferable that the rubber composition according to the present invention further include at least one component selected from the group consisting of carbon black and silica. As the carbon black, SRF, GPF, FEF, HAF, ISAF, or SAF carbon black may be used, for example. It is preferable to use carbon black having an iodine adsorption (IA) of 60 mg/g or more and a dibutyl phthalate absorption (DBP) of 80 ml/100 g or more. The effect of improving the grip performance and the fracture resistance increases when using the carbon black. It is particularly preferable to use HAF, ISAF, or SAF carbon black that exhibits excellent wear resistance. The carbon blacks may be used either individually or in combination.

Examples of the silica include wet silica (hydrous silicic acid), dry silica (silicic acid anhydride), calcium silicate, aluminum silicate, and the like. Among these, wet silica is preferable due to the effect of improving fracture resistance while maintaining wet grip characteristics and low rolling resistance. The silicas may be used either individually or in combination.

The total amount of the silica and the carbon black in the rubber composition according to the present invention is preferably 20 to 120 parts by mass based on 100 parts by mass of the rubber component. The total amount of the silica and the carbon black is more preferably 25 to 100 parts by mass from the viewpoint of a reinforcement effect and an improvement in various properties. If the total amount of the silica and the carbon black is less than 20 parts by mass, fracture resistance and the like may not be sufficiently improved. If the total amount of the silica and the carbon black is more than 120 parts by mass, the processability of the rubber composition may deteriorate.

When adding the silica to the rubber composition according to the present invention as a reinforcement filler, it is preferable to add a silane coupling agent to the rubber composition in order to further increase the reinforcement effect. Examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N, N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, and the like. Among these, bis(3-triethoxysilylpropyl)polysulfide or 3-trimethoxysilylpropylbenzothiazyl tetrasulfide is preferable from the viewpoint of an improvement in reinforcement and the like. It is particularly preferable to use bis(3-triethoxysilylpropyl)tetrasulfide. The silane coupling agents may be used either individually or in combination.

The amount of the silane coupling agent added is adjusted corresponding to the type of silane coupling agent and the like. The silane coupling agent is preferably used in an amount of 1 to 20 parts by mass, and more preferably 3 to 15 parts by mass, based on 100 parts by mass of the silica. If the amount of the silane coupling agent is less than 1 part by mass, the silane coupling agent may not exhibit a sufficient coupling effect. If the amount of the silane coupling agent is more than 20 parts by mass, the rubber component may gel.

Various chemicals, additives, and the like normally used in the rubber industry may optionally be added to the rubber composition according to the present invention insofar as the object of the present invention is not impaired. For example, stearic acid, an aging preventive, zinc oxide, a vulcanization accelerator, a vulcanizing agent, a vulcanization assistant, a processing aid, a process oil, an anti-scorching agent, and the like may be added to the rubber composition according to the present invention.

The vulcanizing agent is preferably sulfur. The vulcanizing agent is preferably used in an amount of 0.1 to 3 parts by mass, and more preferably 0.5 to 2 parts by mass, based on 100 parts by mass of the raw material rubber (i.e., the rubber component). As the vulcanization assistant and the processing aid, stearic acid is preferably used. The vulcanization assistant and the processing aid are preferably used in an amount of 0.5 to 5 parts by mass based on 100 parts by mass of the raw material rubber (i.e., the rubber component). Examples of the vulcanization accelerator include thiazole vulcanization accelerators such as a vulcanization accelerator M (2-mercaptobenzothiazole), a vulcanization accelerator DM (dibenzothiazyl disulfide), and a vulcanization accelerator CZ (N-cyclohexyl-2-benzothiazylsulfeneamide). The vulcanization accelerator is preferably used in an amount of 0.1 to 5 parts by mass, and more preferably 0.2 to 3 parts by mass, based on 100 parts by mass of the raw material rubber (rubber component).

The rubber composition according to the present invention may be produced by kneading the raw materials such as the rubber component, carbon black, and silica using a mixer such as an open mixer (e.g., roller) or an internal mixer (e.g., Banbury mixer). The rubber composition may then be molded and vulcanized to produce a rubber product. Specific examples of the rubber product include a tire tread, an under-tread, a carcass, a sidewall, a bead, a rubber vibration insulator, a fender beam, a belt, a hose, and the like. The rubber composition according to the present invention is suitable for tire applications (e.g., tire tread, under-tread, carcass, sidewall, and bead) and other industrial applications (e.g., rubber vibration insulator, fender beam, belt, and hose), for example.

The rubber composition according to the present invention may be particularly suitably used as a tire tread rubber or a tire sidewall rubber.

[4] Tire Member and Tire

A tire member according to the present invention includes the rubber composition according to the present invention. The tire member according to the present invention exhibits low heat build-up and excellent wear resistance. Specific examples of the tire member according to the present invention include a tire tread, an under-tread, a carcass, a sidewall, a bead, and the like. The tire member according to the present invention is preferably a tire tread or a tire sidewall. A tire according to the present invention includes the tire member according to the present invention. The tire according to the present invention preferably includes the tire member according to the present invention as a tire tread or a tire sidewall. Since the tire according to the present invention includes the tire member according to the present invention, the tire according to the present invention exhibits low heat build-up and excellent wear resistance.

EXAMPLES

The present invention is further described below by way of examples. Note that the present invention is not limited to the following examples. In the examples and comparative examples, the unit "part" refers to "part by mass" and the unit "%" refers to "mass %" unless otherwise indicated.

Synthesis Example 1

Synthesis of Conjugated Diene Polymer

A 5-liter autoclave of which the internal atmosphere was replaced by nitrogen was charged with 2.4 kg of cyclohexane and 300 g of 1,3-butadiene. A cyclohexane solution containing neodymium versatate (hereinafter may be referred to as "Nd(ver)$_3$", 0.18 mmol), a toluene solution containing methylalumoxane (hereinafter may be referred to as "MAO", 3.6 mmol), a toluene solution containing hydrogenated diisobutylaluminum (hereinafter may be referred to as "Al$^i$Bu$_2$H", 6.7 mmol), a toluene solution containing trimethylsilyl iodide (hereinafter may be referred to as "Me$_3$SiI", 0.36 mmol), and 0.90 mmol of 1,3-butadiene were reacted and aged at 30° C. for 60 minutes to obtain a catalyst composition (iodine atom/lanthanoid-containing compound=2.0 (molar ratio)). The autoclave was charged with the catalyst composition, and the components were polymerized at 30° C. for two hours to obtain a polymer solution. The reaction conversion rate of 1,3-butadiene was about 100%.

200 g of the polymer solution was removed in order to measure the properties of the unmodified conjugated diene polymer (hereinafter may be referred to as "polymer"). A methanol solution containing 1.5 g of 2,4-di-t-butyl-p-cresol was added to the polymer solution to terminate the polymerization reaction. After removing the solvent by steam stripping, the product was dried using a roll at 110° C. to obtain a polymer (indicated by "A-1" in Table 2).

The properties of the polymer were measured by the following methods. The mixing amount of each component and properties of the polymer are shown in Table 1. In Table 1, "Nd(ver)$_3$" indicates the cyclohexane solution containing neodymium versatate, "MAO" indicates the toluene solution containing methylalumoxane, "Al$^i$Bu$_2$H" indicates the toluene solution containing hydrogenated diisobutylaluminum, and "Me$_3$SiI" indicates the toluene solution containing trimethylsilyl iodide.

TABLE 1

| | 1,3-Cyclohexane (kg) | 1,3-Butadiene (g) | Catalyst composition Component (a) Type | Amount (mmol) | Component (b) (Aluminoxane) Type | Amount (mmol) | Component (b) (Organoaluminum compound) Type | Amount (mmol) |
|---|---|---|---|---|---|---|---|---|
| Synthesis Example 1 | 2.4 | 300 | Nd(Ver)$_3$ | 0.18 | MAO | 3.60 | Al$^i$Bu$_2$H | 6.70 |
| Synthesis Example 2 | 2.4 | 300 | Nd(Ver)$_3$ | 0.18 | MAO | 3.60 | Al$^i$Bu$_2$H | 6.70 |
| Synthesis Example 3 | 2.4 | 300 | Nd(Ver)$_3$ | 0.18 | MAO | 3.60 | Al$^i$Bu$_2$H | 6.70 |
| Synthesis Example 4 | 2.4 | 300 | Nd(Ver)$_3$ | 0.18 | MAO | 3.60 | Al$^i$Bu$_2$H | 6.70 |
| Synthesis Example 5 | 2.4 | 300 | Nd(Ver)$_3$ | 0.18 | MAO | 3.60 | Al$^i$Bu$_2$H | 6.70 |
| Synthesis Example 6 | 2.4 | 300 | Nd(Ver)$_3$ | 0.18 | MAO | 3.60 | Al$^i$Bu$_2$H | 6.70 |
| Synthesis Example 7 | 2.4 | 300 | Nd(Ver)$_3$ | 0.18 | MAO | 3.60 | Al$^i$Bu$_2$H | 6.70 |
| Synthesis Example 8 | 2.4 | 300 | Nd(Ver)$_3$ | 0.18 | MAO | 3.60 | Al$^i$Bu$_2$H | 6.70 |
| Synthesis Example 9 | 2.4 | 300 | Nd(Ver)$_3$ | 0.18 | MAO | 3.60 | Al$^i$Bu$_2$H | 6.70 |
| Synthesis Example 10 | 2.4 | 300 | Nd(Ver)$_3$ | 0.18 | MAO | 3.60 | Al$^i$Bu$_2$H | 6.70 |
| Synthesis Example 11 | 2.4 | 300 | Nd(Ver)$_3$ | 0.18 | MAO | 3.60 | Al$^i$Bu$_2$H | 6.70 |
| Synthesis Example 12 | 2.4 | 300 | Nd(Ver)$_3$ | 0.18 | MAO | 3.60 | Al$^i$Bu$_2$H | 6.70 |
| Synthesis Example 13 | 2.4 | 300 | Nd(Ver)$_3$ | 0.18 | MAO | 3.60 | Al$^i$Bu$_2$H | 4.20 |
| Synthesis Example 14 | 2.4 | 300 | Nd(Ver)$_3$ | 0.18 | MAO | 3.60 | Al$^i$Bu$_2$H | 6.70 |
| Synthesis Example 15 | 2.4 | 300 | Nd(Ver)$_3$ | 0.18 | MAO | 12.00 | Al$^i$Bu$_2$H | 4.90 |
| Synthesis Example 16 | 2.4 | 300 | Nd(Ver)$_3$ | 0.18 | MAO | 12.00 | Al$^i$Bu$_2$H | 4.90 |
| Commercially available product | — | — | — | — | — | — | — | — |

| | Catalyst composition Component (c) Type | Amount (mmol) | 1,3-Butadiene (mmol) | Mooney viscosity ML$_{1+4}$ (100° C.) | Mw/Mn | cis-1,4 bond (%) | 1,2-vinyl bond (%) |
|---|---|---|---|---|---|---|---|
| Synthesis Example 1 | Me$_3$SiI | 0.36 | 0.90 | 13 | 1.5 | 99.3 | 0.21 |
| Synthesis Example 2 | Me$_3$SiI | 0.36 | 0.90 | 12 | 1.6 | 99.2 | 0.19 |
| Synthesis Example 3 | Me$_3$SiI | 0.36 | 0.90 | 13 | 1.6 | 99.3 | 0.18 |
| Synthesis Example 4 | Me$_3$SiI | 0.36 | 0.90 | 13 | 1.6 | 99.1 | 0.20 |
| Synthesis Example 5 | Me$_3$SiI | 0.36 | 0.90 | 13 | 1.5 | 99.1 | 0.21 |
| Synthesis Example 6 | Me$_3$SiI | 0.36 | 0.90 | 11 | 1.6 | 99.2 | 0.19 |
| Synthesis Example 7 | Me$_3$SiI | 0.36 | 0.90 | 11 | 1.6 | 99.2 | 0.19 |
| Synthesis Example 8 | Me$_3$SiI | 0.36 | 0.90 | 13 | 1.6 | 99.3 | 0.18 |
| Synthesis Example 9 | Me$_3$SiI | 0.36 | 0.90 | 12 | 1.5 | 99.1 | 0.19 |
| Synthesis Example 10 | Me$_3$SiI | 0.36 | 0.90 | 12 | 1.6 | 99.2 | 0.21 |
| Synthesis Example 11 | Me$_3$SiI | 0.36 | 0.90 | 11 | 1.5 | 99.2 | 0.20 |
| Synthesis Example 12 | Me$_3$SiI | 0.36 | 0.90 | 13 | 1.6 | 99.3 | 0.19 |
| Synthesis Example 13 | Me$_3$SiI | 0.36 | 0.90 | 35 | 1.5 | 99.1 | 0.19 |
| Synthesis Example 14 | Me$_3$SiI | 0.36 | 0.90 | 12 | 1.6 | 99.2 | 0.19 |

TABLE 1-continued

| Synthesis Example 15 | Me$_3$SiCl | 0.36 | 0.90 | 13 | 2.2 | 96.6 | 0.88 |
| Synthesis Example 16 | Me$_3$SiCl | 0.36 | 0.90 | 14 | 2.1 | 96.8 | 0.87 |
| Commercially available product | — | — | — | 45 | 4.8 | 94.5 | 2.52 |

Mooney Viscosity (ML$_{1+4}$, 100° C.):

The Mooney viscosity was measured using an L-rotor in accordance with JIS K 6300 (preheating time: 1 min, rotor operation time: 4 min, temperature: 100° C.).

Molecular Weight Distribution (Mw/Mn):

The molecular weight distribution (Mw/Mn) (standard polystyrene-reduced value) was measured using a gel permeation chromatograph ("HLC-8120GPC" manufactured by Tosoh Corporation) and a differential refractometer (detector) under the following conditions.

Column: "GMHHXL" manufactured by Tosoh Corporation (two columns)
Column temperature: 40° C.
Mobile phase: tetrahydrofuran
Flow rate: 1.0 ml/min
Sample concentration: 10 mg/20 ml Cis-1,4-Bond Content and 1,2-vinyl Bond Content:

The cis-1,4-bond content and the 1,2-vinyl bond content were measured by $^1$H-NMR analysis and $^{13}$C-NMR analysis. "EX-270" manufactured by JEOL Ltd. was used for NMR analysis. The ratio of the 1,4-bond to the 1,2-bond in the polymer was calculated from the signal intensities at 5.30 to 5.50 ppm (1,4-bond) and 4.80 to 5.01 ppm (1,2-bond) determined by $^1$H-NMR analysis. The ratio of the cis-1,4-bond to the trans-1,4-bond in the polymer was calculated from the signal intensities at 27.5 ppm (cis-1,4-bond) and 32.8 ppm (trans-1,4-bond) determined by $^{13}$C-NMR analysis. The cis-1,4-bond content (%) and the 1,2-vinyl bond content (%) were thus determined.

Measurement Results:

The polymer had a Mooney viscosity (ML$_{1+4}$, 100° C.) of 13, a molecular weight distribution (Mw/Mn) of 1.5, a cis-1,4-bond content of 99.3%, and a 1,2-vinyl bond content of 0.21%.

Synthesis Examples 2 to 16

Polymers of Synthesis Examples 2 to 16 ("A-2" to "A-16" in Table 2) were obtained in the same manner as in Synthesis Example 1, except for using components shown in Table 1 in amounts shown in Table 1. The properties of the polymers were measured in the same manner as in Synthesis Example 1. The measurement results are shown in Table 1. In Tables 1 and 2, the term "commercially available product" refers to a polybutadiene rubber ("BR01" manufactured by JSR Corporation).

Measurement Results:

As shown in Table 1, it was confirmed that the polymers of Synthesis Examples 2 to 14 had properties similar to those of the polymer of Synthesis Example 1. The polymers of Synthesis Examples 15 and 16 and the commercially available polybutadiene rubber had a cis-1,4-bond content of 98.5% or less (i.e., the cis-1,4-bond content was not sufficiently high).

Example 1

Synthesis of Modified Conjugated Diene Polymer

The polymer solution of the conjugated diene polymer of Synthesis Example 1 was treated as follows to obtain a modified conjugated diene polymer (hereinafter may be referred to as "modified polymer"). Specifically, a toluene solution containing 3-glycidoxypropyltrimethoxysilane (hereinafter may be referred to as "GPMOS", 1.71 mmol) was added to the polymer solution maintained at 30° C. The mixture was allowed to react for 30 minutes to obtain a reaction solution. After the addition of a toluene solution containing tetraisopropyl titanate (hereinafter may be referred to as "IPOTi", 1.28 mmol) to the reaction solution, the mixture was stirred for 30 minutes. The polymerization reaction was terminated by adding a methanol solution containing 1.5 g of 2,4-di-t-butyl-p-cresol to obtain 2.5 kg of a modified polymer solution. After the addition of 20 l of an aqueous solution (the pH of the solution was adjusted to 10 using sodium hydroxide) to the modified polymer solution, the mixture was subjected to a condensation reaction at 110° C. for two hours while removing the solvent. The resulting product was dried using a roll at 110° C. to obtain a modified polymer (indicated by "H-1" in Table 3).

The properties of the modified polymer were measured by the following methods. The type of each component, the mixing amounts of the alkoxysilane compound, the functional group-introducing agent, and the condensation catalyst, and the properties of the modified polymer are shown in Table 2. The molecular weight distribution (Mw/Mn) was measured under the same conditions as for the above described polymer. In Table 2, "GPMOS" indicates the toluene solution containing 3-glycidoxypropyltrimetoxysilane, and "IPOTi" indicates the toluene solution containing tetraisopropyl titanate.

TABLE 2

| | Conjugated diene polymer | Alkoxysilane compound | | Functional group-introducing agent | | Condensation catalyst | | Mooney viscosity | | Cold flow | |
|---|---|---|---|---|---|---|---|---|---|---|---|
| | | Type | Amount (mmol) | Type | Amount (mmol) | Type | Amount (mmol) | ML$_{1+4}$ (125° C.) | Mw/Mn | value (mg/min) | Temporal stability |
| Example 1 | A-1 | GPMOS | 1.71 | — | — | IPOTi | 1.28 | 49 | 1.9 | 0.4 | 1 |
| Example 2 | A-2 | GPMOS | 1.71 | — | — | EHOTi | 1.28 | 51 | 2.0 | 0.5 | 1 |
| Example 3 | A-3 | GPMOS | 1.71 | — | — | TiAC | 1.28 | 49 | 2.0 | 0.6 | 1 |

TABLE 2-continued

|  | Conjugated diene polymer | Alkoxysilane compound | | Functional group-introducing agent | | Condensation catalyst | | Mooney viscosity | | Cold flow | |
| --- | --- | --- | --- | --- | --- | --- | --- | --- | --- | --- | --- |
|  |  | Type | Amount (mmol) | Type | Amount (mmol) | Type | Amount (mmol) | $ML_{1+4}$ (125° C.) | Mw/Mn | value (mg/min) | Temporal stability |
| Example 4 | A-4 | GPMOS | 1.71 | — | — | BEHAT | 1.28 | 68 | 2.6 | 0.2 | 1 |
| Example 5 | A-5 | GPMOS | 1.71 | — | — | DBTDL | 1.28 | 66 | 1.9 | 0.5 | 1 |
| Example 6 | A-6 | GPMOS | 1.71 | — | — | EHABi | 1.28 | 64 | 1.9 | 0.6 | 1 |
| Example 7 | A-7 | GPMOS | 1.71 | — | — | NPOZr | 1.28 | 61 | 1.9 | 0.5 | 1 |
| Example 8 | A-8 | GPMOS | 1.71 | — | — | SBOAl | 1.28 | 54 | 2.0 | 0.4 | 1 |
| Example 9 | A-9 | IPEOS | 1.71 | — | — | IPOTi | 1.28 | 52 | 2.0 | 0.5 | 1 |
| Example 10 | A-10 | GPMOS | 1.71 | APEOS | 1.71 | IPOTi | 1.28 | 46 | 2.4 | 0.3 | 2 |
| Example 11 | A-11 | GPMOS | 1.71 | EOSDI | 1.71 | IPOTi | 1.28 | 45 | 2.2 | 0.3 | 2 |
| Example 12 | A-12 | GPMOS | 1.71 | MPEOS | 1.71 | IPOTi | 1.28 | 43 | 2.3 | 0.4 | 2 |
| Comparative Example 1 | A-13 | — | — | — | — | — | — | — | — | 20.1 | 1 |
| Comparative Example 2 | A-14 | GPMOS | 1.71 | — | — | — | — | 63 | 2.4 | 0.4 | 13 |
| Comparative Example 3 | A-15 | GPMOS | 1.71 | — | — | IPOTi | 1.28 | 44 | 2.5 | 0.6 | 1 |
| Comparative Example 4 | A-16 | GPMOS | 1.71 | APEOS | 1.71 | IPOTi | 1.28 | 42 | 3.0 | 0.5 | 1 |
| Comparative Example 5 | Commercially available product | — | — | — | — | — | — | — | — | 0.6 | 1 |

Mooney Viscosity ($ML_{1+4}$, 125° C.):

The Mooney viscosity was measured using an L-rotor in accordance with JIS K 6300 (preheating time: 1 min, rotor operation time: 4 min, temperature: 125° C.).

Cold Flow Value:

The cold flow value was measured by extruding the polymer through a ¼-inch orifice at a pressure of 3.5 lb/in$^2$ and a temperature of 50° C. The extrusion speed was measured after 10 minutes in order to achieve a stationary state. The measured value was indicated by mg/min.

Temporal Stability:

The Mooney viscosity ($ML_{1+4}$, 125° C.) was measured after allowing the polymer to stand in a thermostat bath at 90° C. for two days, and the temporal stability was calculated using the following expression. The smaller the value, the better the temporal stability is.

[Mooney viscosity ($ML_{1+4}$, 125° C.) measured after allowing polymer to stand in thermostat bath at 90° C. for two days]-[Mooney viscosity ($ML_{1+4}$, 125° C.) measured immediately after synthesis]

Measurement Results:

The modified polymer (A-2) had a Mooney viscosity ($ML_{1+4}$, 125° C.) of 49, a molecular weight distribution of 1.9, a cold flow value of 0.4, and a temporal stability of 1.

Examples 2 to 12 and Comparative Examples 1 to 4

Modified polymers of Examples 2 to 12 (indicated by "H-2" to "H-12" in Tables 3 and 5) and modified polymers of Comparative Examples 1 to 4 (indicated by "h-1" to "h-4" in Tables 4 and 5) were prepared in the same manner as in Example 1, except for using components shown in Table 2 in amounts shown in Table 2. The properties of the modified polymers were measured in the same manner as in Example 1. The measurement results are shown in Table 2.

In Table 2, "EHOTi" indicates a toluene solution containing tetra-2-ethylhexyl titanate, "TiAC" indicates a toluene solution containing titanium tetraacetylacetonate, "BEHAT" indicates a toluene solution containing tin tetrabis(2-ethylhexanoate), "DBTDL" indicates a toluene solution containing dibutyltin dilaurate, "EHABi" indicates a toluene solution containing bismuth tris(2-ethylhexanoate), "NPOZr" indicates a toluene solution containing tetra-n-propoxyzirconium, "SBOAl" indicates a toluene solution containing tri-sec-butoxyaluminum, "IPEOS" indicates a toluene solution containing 3-isocyanatopropyltriethoxysilane, "APEOS" indicates a toluene solution containing 3-aminopropyltriethoxysilane, "EOSDI" indicates a toluene solution containing N-(3-triethoxysilylpropyl)-4,5-dihydroimidazole, and "MPEOS" indicates a toluene solution containing 3-mercaptopropyltriethoxysilane.

Measurement Results:

As shown in Table 2, it was confirmed that the polymers of Examples 2 to 12 had properties similar to those of the polymer of Example 1.

Example 13

Preparation of Rubber Composition 55 parts of silica ("Nipsil AQ" manufactured by Tosoh Silica Corporation), 10 parts of aroma oil ("Fukkol Aromax #3" manufactured by Fuji Kosan Co., Ltd.), 2 parts of stearic acid, 5.5 parts of bis(3-triethoxysilylpropyl)tetrasulfide ("Si69" manufactured by Degussa) (silane coupling agent), 1 part of N-phenyl-N'-(1,3-dimethylbutyl)-p-phenylenediamine ("Nocrac 6C" manufactured by Ouchi Shinko Chemical Industrial Co., Ltd.) (aging preventive), 3 parts of zinc oxide, 1 part of 1,3-diphenylguanidine ("Nocceler D" manufactured by Ouchi Shinko Chemical Industrial Co., Ltd., "vulcanization accelerator (A)" in Table 3) (vulcanization accelerator), 1 part of di-2-benzothiazolyl disulfide ("Nocceler DM" manufactured by Ouchi Shinko Chemical Industrial Co., Ltd., "vulcanization accelerator (B)" in Table 3) (vulcanization accelerator), 1 part of N-t-butyl-2-benzothiazolylsulfenamide ("Nocceler NS-F" manufactured by Ouchi Shinko Chemical Industrial Co., Ltd., "vulcanization accelerator (C)" in Table 3) (vulcanization accelerator), and 1.5 parts of sulfur were mixed with 100 parts of a rubber component including 70% of the modified polymer of Example 1 and 30% of natural rubber. The mixture was kneaded using a plasto-mill to prepare a silica-containing rubber composition.

The silica-containing rubber composition was vulcanized at 150° C. for 12 minutes to obtain a silica-containing vulcanized rubber. The properties of the silica-containing vulcanized rubber were evaluated by the following evaluation methods. The Mooney viscosity ($ML_{1+4}$, 100° C.) was measured under the same conditions as in Example 1. The evaluation result is indicated by an index with respect to the value of the vulcanized rubber of Comparative Example 13 as a reference value (100).

Giken Co., Ltd.) at a slip ratio of 60%. A higher measured value indicates better wear resistance.

Evaluation Results:

The silica-containing vulcanized rubber had a Mooney viscosity ($ML_{1+4}$, 100° C.) of 58, a tensile strength of 112, a low heat build-up value of 149, a low-temperature property value of 201, and a wear resistance value of 158. Therefore, it was confirmed that the heat build-up properties and the wear resistance of the silica-containing vulcanized rubber of this example were sufficiently improved. Specifically, it was confirmed that the heat build-up properties and the wear resistance of the rubber composition of this example and the modified polymer of Example 1 used in this example were sufficiently improved.

TABLE 3

| | | Example | | | | | | | | | | | | | | | |
|---|---|---|---|---|---|---|---|---|---|---|---|---|---|---|---|---|---|
| | | 13 | 14 | 15 | 16 | 17 | 18 | 19 | 20 | 21 | 22 | 23 | 24 | 25 | 26 | 27 | 28 |
| Modified polymer | Type | H-1 | H-2 | H-3 | H-4 | H-5 | H-6 | H-7 | H-8 | H-9 | H-10 | H-11 | H-12 | H-1 | H-10 | H-11 | H-12 |
| | Amount (parts) | 70 | 70 | 70 | 70 | 70 | 70 | 70 | 70 | 70 | 70 | 70 | 70 | 50 | 50 | 50 | 50 |
| Natural rubber (parts) | | 30 | 30 | 30 | 30 | 30 | 30 | 30 | 30 | 30 | 30 | 30 | 30 | 50 | 50 | 50 | 50 |
| Silica (parts) | | 55 | 55 | 55 | 55 | 55 | 55 | 55 | 55 | 55 | 55 | 55 | 55 | — | — | — | — |
| Carbon black (parts) | | — | — | — | — | — | — | — | — | — | — | — | — | 50 | 50 | 50 | 50 |
| Aroma oil (parts) | | 10 | 10 | 10 | 10 | 10 | 10 | 10 | 10 | 10 | 10 | 10 | 10 | 10 | 10 | 10 | 10 |
| Stearic acid (parts) | | 2 | 2 | 2 | 2 | 2 | 2 | 2 | 2 | 2 | 2 | 2 | 2 | 2 | 2 | 2 | 2 |
| Silane coupling agent (parts) | | 5.5 | 5.5 | 5.5 | 5.5 | 5.5 | 5.5 | 5.5 | 5.5 | 5.5 | 5.5 | 5.5 | 5.5 | — | — | — | — |
| Aging preventives (parts) | | 1 | 1 | 1 | 1 | 1 | 1 | 1 | 1 | 1 | 1 | 1 | 1 | 1 | 1 | 1 | 1 |
| Zinc oxide (parts) | | 3 | 3 | 3 | 3 | 3 | 3 | 3 | 3 | 3 | 3 | 3 | 3 | 3 | 3 | 3 | 3 |
| Vulcanization accelerator (A) (parts) | | 1 | 1 | 1 | 1 | 1 | 1 | 1 | 1 | 1 | 1 | 1 | 1 | 0.5 | 0.5 | 0.5 | 0.5 |
| Vulcanization accelerator (B) (parts) | | 1 | 1 | 1 | 1 | 1 | 1 | 1 | 1 | 1 | 1 | 1 | 1 | 0.5 | 0.5 | 0.5 | 0.5 |
| Vulcanization accelerator (C) (parts) | | 1 | 1 | 1 | 1 | 1 | 1 | 1 | 1 | 1 | 1 | 1 | 1 | 0.5 | 0.5 | 0.5 | 0.5 |
| Sulfur (parts) | | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |

Tensile Strength ($T_B$):

The tensile strength was measured in accordance with JIS K 6310. A higher measured value indicates better tensile strength.

Low Heat Build-Up (3% tan δ):

The low heat build-up value was measured using a dynamic spectrometer (manufactured by Rheometrics Scientific Inc. (U.S.A.)) at a tensile dynamic strain of 3%, a frequency of 15 Hz, and a temperature of 50° C. A higher measured value indicates lower heat build-up.

Low-Temperature Properties (−20° CG'):

The low-temperature properties (−20° CG') were measured using a dynamic spectrometer (manufactured by Rheometrics Scientific Inc. (U.S.A)) at a tensile dynamic strain of 0.1%, a frequency of 15 Hz, and a temperature of −20° C. A higher measured value indicates better low-temperature properties (e.g., grip performance on snow or an icy road).

Wear Resistance:

The wear resistance was measured at room temperature using a Lambourn abrasion tester (manufactured by Shimada Examples 14 to 28 and Comparative Examples 6 to 13

Rubber compositions of Examples 14 to 28 were prepared in the same manner as in Example 13, except that the composition was changed as shown in Table 3. Rubber compositions of Comparative Examples 6 to 13 were prepared in the same manner as in Example 13, except that the composition was changed as shown in Table 4. In Comparative Examples 10 and 13, the commercially available polybutadiene rubber ("BR01" manufactured by JSR Corporation) was used (indicated by "h-5" in Tables 4 and 5). Each rubber composition was vulcanized to prepare a vulcanized rubber. The properties of the vulcanized rubber were evaluated. The evaluation results are shown in Table 5.

Note that carbon black added to the rubber compositions of Examples 25 to 28 and Comparative Examples 11 to 13 was "Seast KH" manufactured by Tokai Carbon Co., Ltd. The rubber compositions to which carbon black was added were vulcanized at 145° C. for 30 minutes.

TABLE 4

|  |  | Comparative Example | | | | | | | |
| --- | --- | --- | --- | --- | --- | --- | --- | --- | --- |
|  |  | 6 | 7 | 8 | 9 | 10 | 11 | 12 | 13 |
| Modified polymer | Type | h-1 | h-2 | h-3 | h-4 | h-5 | h-3 | h-4 | h-5 |
|  | Amount (parts) | 70 | 70 | 70 | 70 | 70 | 50 | 50 | 50 |
| Natural rubber (parts) |  | 30 | 30 | 30 | 30 | 30 | 50 | 50 | 50 |
| Silica (parts) |  | 55 | 55 | 55 | 55 | 55 | — | — | — |
| Carbon black (parts) |  | — | — | — | — | — | 50 | 50 | 50 |
| Aroma oil (parts) |  | 10 | 10 | 10 | 10 | 10 | 10 | 10 | 10 |
| Stearic acid (parts) |  | 2 | 2 | 2 | 2 | 2 | 2 | 2 | 2 |
| Silane coupling agent (parts) |  | 5.5 | 5.5 | 5.5 | 5.5 | 5.5 | — | — | — |
| Aging preventives (parts) |  | 1 | 1 | 1 | 1 | 1 | 1 | 1 | 1 |
| Zinc oxide (parts) |  | 3 | 3 | 3 | 3 | 3 | 3 | 3 | 3 |
| Vulcanization accelerator (A) (parts) |  | 1 | 1 | 1 | 1 | 1 | 0.5 | 0.5 | 0.5 |
| Vulcanization accelerator (B) (parts) |  | 1 | 1 | 1 | 1 | 1 | 0.5 | 0.5 | 0.5 |
| Vulcanization accelerator (C) (parts) |  | 1 | 1 | 1 | 1 | 1 | 0.5 | 0.5 | 0.5 |
| Sulfur (parts) |  | 1.5 | 1.5 | 1.5 | 1.5 | 1.5 | 1.5 | 1.5 | 1.5 |

TABLE 5

|  | Modified polymer |  | Mooney viscosity $ML_{1+4}$ (100° C.) | Tensile strength Index | Low heat build-up Index | Low-temperature properties Index | Wear resistance Index |
| --- | --- | --- | --- | --- | --- | --- | --- |
| Example 13 | H-1 | Silica-containing vulcanized rubber | 58 | 112 | 149 | 201 | 158 |
| Example 14 | H-2 |  | 56 | 111 | 151 | 210 | 156 |
| Example 15 | H-3 |  | 59 | 112 | 148 | 207 | 157 |
| Example 16 | H-4 |  | 78 | 115 | 141 | 186 | 149 |
| Example 17 | H-5 |  | 73 | 114 | 143 | 187 | 151 |
| Example 18 | H-6 |  | 71 | 114 | 144 | 188 | 149 |
| Example 19 | H-7 |  | 65 | 113 | 146 | 189 | 148 |
| Example 20 | H-8 |  | 61 | 113 | 143 | 189 | 148 |
| Example 21 | H-9 |  | 59 | 114 | 145 | 194 | 157 |
| Example 22 | H-10 |  | 55 | 113 | 147 | 195 | 160 |
| Example 23 | H-11 |  | 54 | 116 | 146 | 197 | 159 |
| Example 24 | H-12 |  | 53 | 109 | 148 | 198 | 159 |
| Example 25 | H-1 | Carbon black-containing vulcanized rubber | 85 | 108 | 137 | — | 138 |
| Example 26 | H-10 |  | 86 | 106 | 148 | — | 151 |
| Example 27 | H-11 |  | 87 | 105 | 149 | — | 149 |
| Example 28 | H-12 |  | 91 | 108 | 143 | — | 155 |
| Comparative Example 6 | h-1 | Silica-containing vulcanized rubber | 50 | 107 | 105 | 115 | 135 |
| Comparative Example 7 | h-2 |  | 72 | 109 | 110 | 132 | 143 |
| Comparative Example 8 | h-3 |  | 57 | 108 | 136 | 185 | 132 |
| Comparative Example 9 | h-4 |  | 56 | 110 | 137 | 183 | 135 |
| Comparative Example 10 | h-5 |  | 71 | 100 | 100 | 100 | 100 |
| Comparative Example 11 | h-3 | Carbon black-containing vulcanized rubber | 87 | 103 | 125 | — | 124 |
| Comparative Example 12 | h-4 |  | 86 | 106 | 136 | — | 133 |
| Comparative Example 13 | h-5 |  | 83 | 100 | 100 | — | 100 |

Evaluation Results:

As shown in Table 5, the silica-containing vulcanized rubbers of Examples 13 to 24 had a Mooney viscosity ($ML_{1+4}$, 100° C.), a tensile strength, and low-temperature properties similar to those of the silica-containing vulcanized rubbers of Comparative Examples 6 to 10 (i.e., the silica-containing vulcanized rubbers of Examples 13 to 24 maintained the Mooney viscosity ($ML_{1+4}$, 100° C.), tensile strength, and low-temperature properties). Excellent evaluation results were obtained for the silica-containing vulcanized rubbers of Examples 13 to 24 as to low heat build-up and wear resistance as compared with the silica-containing vulcanized rubbers of Comparative Examples 6 to 10. Specifically, it was confirmed that the rubber compositions of Examples 13 to 24 and the modified polymers of Examples 1 to 12 used in Examples 13 to 24 exhibited low heat build-up and excellent wear resistance while maintaining the Mooney viscosity ($ML_{1+4}$, 100° C.), tensile strength, and low-temperature properties.

The carbon black-containing vulcanized rubbers of Examples 25 to 28 had a Mooney viscosity ($ML_{1+4}$, 100° C.) and a tensile strength similar to those of the carbon black-containing vulcanized rubbers of Comparative Examples 11 to 13 (i.e., the carbon black-containing vulcanized rubbers of Examples 25 to 28 maintained the Mooney viscosity ($ML_{1+4}$, 100° C.) and tensile strength). Excellent evaluation results were obtained for the carbon black-containing vulcanized rubbers of Examples 25 to 28 as to low heat build-up and wear resistance as compared with the carbon black-containing vulcanized rubbers of Comparative Examples 11 to 13. Specifically, it was confirmed that the rubber compositions of Examples 25 to 28 and the modified polymers of Examples 1 and 10 to 12 used in Examples 25 to 28 exhibited low heat build-up and excellent wear resistance while maintaining the Mooney viscosity ($ML_{1+4}$, 100° C.) and tensile strength.

It was thus confirmed that the modified conjugated diene polymer obtained by the method for producing a modified conjugated diene polymer according to the present invention and the rubber composition including the modified conjugated diene polymer exhibited sufficiently improved low heat build-up and wear resistance while maintaining the tensile strength and the like as compared with a modified conjugated diene polymer and a rubber composition.

The silica-containing vulcanized rubbers of Examples 13 to 15 and Examples 21 to 24 were produced using the modified polymer produced using the condensation catalyst containing titanium (Ti). Therefore, each vulcanized rubber exhibited a low Mooney viscosity and excellent processability, and had higher low-temperature property and wear resistance evaluation results (i.e., the index value was high) (i.e., each vulcanized rubber exhibited excellent processability, low-temperature properties, and wear resistance).

The carbon black-containing vulcanized rubbers of Examples 26 to 28 other than Example 25 were produced using the functional group-introducing agent. Therefore, the carbon black-containing vulcanized rubbers of Examples 26 to 28 had higher low heat build-up and wear resistance evaluation results (i.e., the index value was high) (i.e., the carbon black-containing vulcanized rubbers of Examples 26 to 28 exhibited more excellent low-temperature properties and wear resistance).

The vulcanized rubbers of Comparative Examples 6 and 7 were produced using the conjugated diene polymer having a cis-1,4-bond content of 99.0% or more. However, since the vulcanized rubber of Comparative Example 6 was produced using the polymer of Synthesis Example 13 (i.e., unmodified conjugated diene polymer), an excellent evaluation result was not obtained for low heat build-up and wear resistance (i.e., low heat build-up and wear resistance were insufficient). Since the vulcanized rubber of Comparative Example 7 was produced using the polymer of Synthesis Example 2 (i.e., conjugated diene polymer modified without using a condensation catalyst), an excellent evaluation result was not obtained for low heat build-up and wear resistance (i.e., low heat build-up and wear resistance were insufficient).

Since the silica-containing vulcanized rubbers of Comparative Examples 8 to 10 and the carbon black-containing vulcanized rubbers of Comparative Examples 11 to 13 were produced using the modified polymers of Comparative Examples 3 and 4 and the modified polymer of Comparative Example 5 (i.e., conjugated diene polymer having a cis-1,4-bond content of 98.5% or less), an excellent evaluation result was not obtained for low heat build-up and wear resistance (i.e., low heat build-up and wear resistance were insufficient).

Industrial Applicability

The method for producing a modified conjugated diene polymer according to the present invention can produce a modified conjugated diene polymer suitable as a material for a tire member (e.g., tire tread, under-tread, carcass, sidewall, and bead) and other industrial products (e.g., rubber vibration insulator, fender, belt, and hose) (particularly a tire tread rubber and a tire sidewall rubber).

The modified conjugated diene polymer according to the present invention is suitable as a material for a tire member (e.g., tire tread, under-tread, carcass, sidewall, and bead) and other industrial products (e.g., rubber vibration insulator, fender, belt, and hose) (particularly a tire tread rubber and a tire sidewall rubber).

The rubber composition according to the present invention is suitable as a material for a tire member (e.g., tire tread, under-tread, carcass, sidewall, and bead) and other industrial products (e.g., rubber vibration insulator, fender, belt, and hose) (particularly a tire tread rubber and a tire sidewall rubber).

The tire member according to the present invention is a tire tread, an under-tread, a carcass, a sidewall, a bead, or the like.

The tire according to the present invention may be suitably used as an automobile tire that aims at reducing fuel consumption.

The invention claimed is:

1. A method for producing a modified conjugated diene polymer comprising
   (A) subjecting a conjugated diene polymer having a cis-1,4-bond content of 98.5% or more and possessing an active end to a modification reaction to introduce an alkoxysilane compound having two or more reactive groups including an alkoxysilyl group into the active end of the conjugated diene polymer, and
   (B) subjecting the residue of the alkoxysilane compound introduced into the active end to a condensation reaction in the presence of a condensation catalyst that includes at least one element selected from the elements of the groups 4A, 2B, 3B, 4B, and 5B of the periodic table,
   wherein the conjugated diene polymer has been polymerized in the presence of a catalyst composition that includes a mixture of components (a) to (c) as the main component, where component (a) is a lanthanoid-containing compound that contains at least one lanthanoid element or a reaction product obtained by reacting the lanthanoid-containing compound with a Lewis base, component (b) is at least one compound selected from an aluminoxane and an organoaluminum compound shown by the general formula (1):

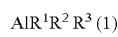

$$AlR^1R^2R^3 \quad (1)$$

in which $R^1$ and $R^2$ individually represent a hydrocarbon group having 1 to 10 carbon atoms or a hydrogen atom, and $R^3$ represents a hydrocarbon group having 1 to 10 carbon atoms that is the same as or differs from $R^1$ and $R^2$, and component (c) is an iodine-containing compound that contains at least one iodine atom in the molecular structure selected from a silicon iodide compound, a hydrocarbon iodide compound, and iodine.

2. The method for producing a modified conjugated diene polymer according to claim 1, wherein component (a) is a lanthanoid-containing compound that contains at least one lanthanoid element.

3. The method for producing a modified conjugated diene polymer according to claim 1, wherein the conjugated diene polymer has a ratio (Mw/Mn) of the weight average molecular weight (Mw) to the number average molecular weight (Mn) of 3.5 or less as determined by gel permeation chromatography.

4. The method for producing a modified conjugated diene polymer according to claim 1, wherein the conjugated diene polymer has a 1,2-vinyl bond content of 0.5 mass % or less.

5. The method for producing a modified conjugated diene polymer according to claim 1, wherein the condensation catalyst includes titanium (Ti).

6. The method for producing a modified conjugated diene polymer according to claim 1, wherein the alkoxysilane compound includes at least one functional group selected from (f) an epoxy group, (g) an isocyanate group, (h) a carbonyl group, and (i) a cyano group.

7. The method for producing a modified conjugated diene polymer according to claim 1, wherein an alkoxysilane compound is additionally introduced that includes at least one functional group selected from (j) an amino group, (k) an imino group, and (l) a mercapto group.

8. The method for producing a modified conjugated diene polymer according to claim 1, wherein the condensation reaction (B) is carried out in an aqueous solution having a pH of 9 to 14 and a temperature of 85 to 180° C.

9. The method for producing a modified conjugated diene polymer according to claim 1, wherein the conjugated diene compound that forms the modified conjugated diene polymer is at least one conjugated diene compound selected from 1,3-butadiene, isoprene, and 2,3-dimethyl-1,3-butadiene.

10. The method for producing a modified conjugated diene polymer according to claim 1, wherein component (c) is a silicon iodide compound of the formula $R^7_m SiI_{4-m}$ wherein $R^7$ represents a hydrocarbon group having 1 to 20 carbon atoms or a hydrogen atom, and m represents an integer from 0 to 3.

11. The method for producing a modified conjugated diene polymer according to claim 1, wherein component (c) is hydrocarbon iodide compound of the formula $R^8_n I_{4-n}$ wherein $R^8$ represents a hydrocarbon group having 1 to 20 carbon atoms, and n represents an integer from 1 to 3.

12. The method for producing a modified conjugated diene polymer according to claim 1, wherein component (c) is iodine.

* * * * *